Dec. 23, 1952     S. L. ADELSON     2,623,112
TELEMETRIC TRANSMITTER
Filed Nov. 20, 1950     3 Sheets-Sheet 1
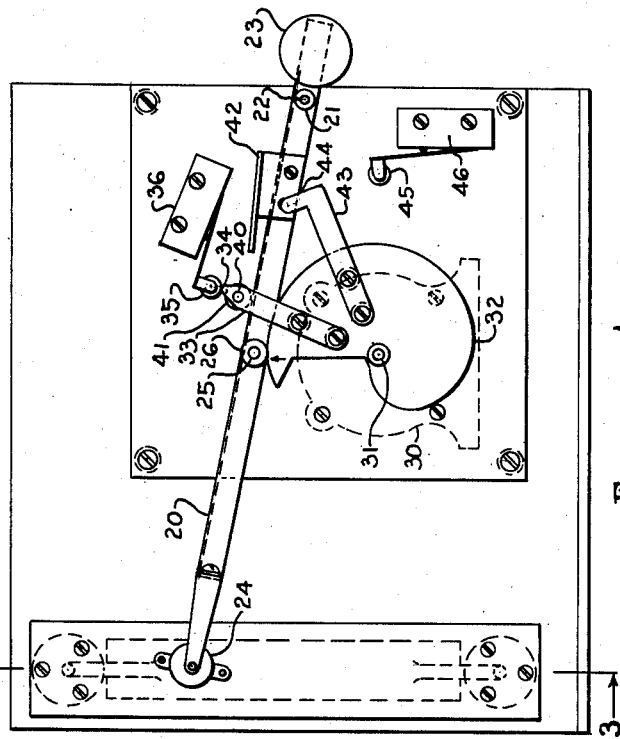
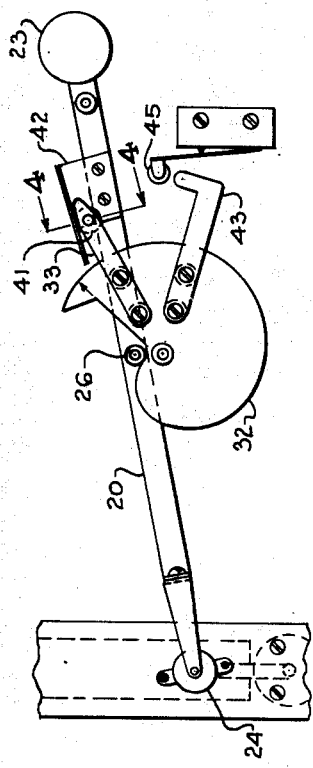
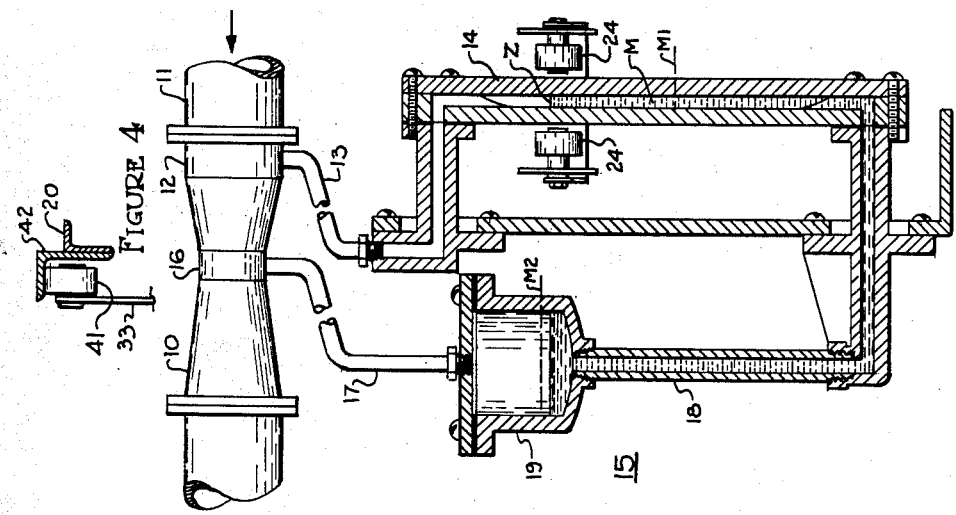
INVENTOR.
Samuel L. Adelson
BY Patented Dec. 23, 1952

2,623,112

UNITED STATES PATENT OFFICE 2,623,112

TELEMETRIC TRANSMITTER

Samuel L. Adelson, Tucson, Ariz., assignor to Infilco Incorporated, Tucson, Ariz., a corporation of Delaware Application November 20, 1950, Serial No. 196,668

10 Claims. (Cl. 177—351)

1

This invention relates to a telemetering transmitter, in which the duration of a signal telemetered to a remote location bears a desired relation to the magnitude of a measurable physical condition, such as the rate of flow of a fluid in a conduit, the elevation of the surface of a liquid in a tank or basin, and the like.

The art of telemetering signals of a time duration bearing a desired relation to the magnitude of a physical condition is not new. However, in my improved telemetering transmitter I employ new means for sensing such physical condition by which friction is entirely eliminated and high accuracy of operation obtained.

I utilize the well known fact that oscillations in an electronic oscillating circuit cease when a metallic substance dissipates the energy which sets up the oscillations, to provide an exact means for sensing the magnitude of the condition to be measured. For example, when it is desired to measure the distance from a datum level to the actual liquid level in the high pressure leg of a manometer to obtain telemetering signals proportional to a flow, the metallic substance which acts to stop oscillations in the oscillating electronic circuit can be any member which is moved in response to changes in the liquid level in the high pressure leg of a manometer. In the preferred embodiment of the invention I utilize the manometric liquid itself as the metallic substance and move the means which set up oscillations in the electronic circuit from a datum level along the high pressure leg of the manometer.

It is an object of this invention to provide a telemetering transmitter of the general type referred to employing new and improved means for sensing the physical condition to be metered.

Another object of the invention is to provide a telemetering transmitter which is capable of accurately determining the location of the mercury level in a manometer without the use of floats and friction creating means such as stuffing boxes, the term "mercury" being used herein to designate any electrically conductive manometric liquid.

Another object of the invention is to provide a telemetering transmitter which transmits a signal of a length directly proportional to the flow of a fluid through a conduit.

Another object is to provide a telemetering transmitter operating on a time cycle which is capable of telemetering signals of the proper duration during approximately 90 per cent of each cycle.

2

Other objects of the invention will become apparent upon consideration of the following detailed description and of the claims.

The invention is particularly useful in telemetering signals corresponding to a flow rate through a conduit and will, therefore, be described as applied thereto. However, the invention is not limited to this particular application, but may be used in telemetering signals corresponding to any variable condition which can be translated into a pressure differential.

In the present art of telemetering signals corresponding to a flow through a conduit, the differential pressure across the upstream and throat sections of a Venturi tube, or across the sections upstream and downstream of an orifice in a conduit produced by a fluid flow therethrough, is usually communicated to a manometer containing a manometric fluid, such as mercury. In one leg of the manometer rides a float which rises and falls with the mercury level as the flow through the conduit varies, the level of the mercury at any time depending upon the flow rate through the conduit at that time. The vertical movement of the float is translated into a rotary movement of a shaft which extends from within the manometer leg through a stuffing box to atmosphere. As the manometer leg is usually under pressure the stuffing box must be pulled up tightly to prevent leakage, and this conduces to friction, which in turn affects the accuracy of the device. Furthermore, the system of mechanical linkages used to translate the vertical movement of the float to a rotary movement of the shaft includes friction causing elements which also affect the accuracy of the device.

My improved telemetering transmitter also utilizes a manometer, the mercury level in one leg of the manometer at any time depending upon the rate of flow through the conduit, the duration of the transmitted signal being a function of the distance of this level from a zero or datum level. However, in my apparatus the position of the mercury at any time is accurately determined without the use of a float, shaft, stuffing box and linkages associated with the float and shaft. Instead of the usual friction creating means I use as a detector of the location of the mercury level an electronic oscillating circuit.

The invention will be more readily understood from a consideration of the accompanying drawings, wherein like reference characters designate similar elements and wherein:

Figure 1 is a front elevation of a preferred embodiment of the invention showing the means for detecting the mercury level of the manometer in zero level position;

Figure 2 is a partial front elevation of the apparatus of Figure 1 showing the means for detecting the mercury level of the manometer in their lowermost position;

Figure 3 is a vertical sectional view along line 3—3 of Figure 1 showing also the connections to the Venturi tube;

Figure 4 is a cross sectional view along line 4—4 of Figure 2;

Figure 5:
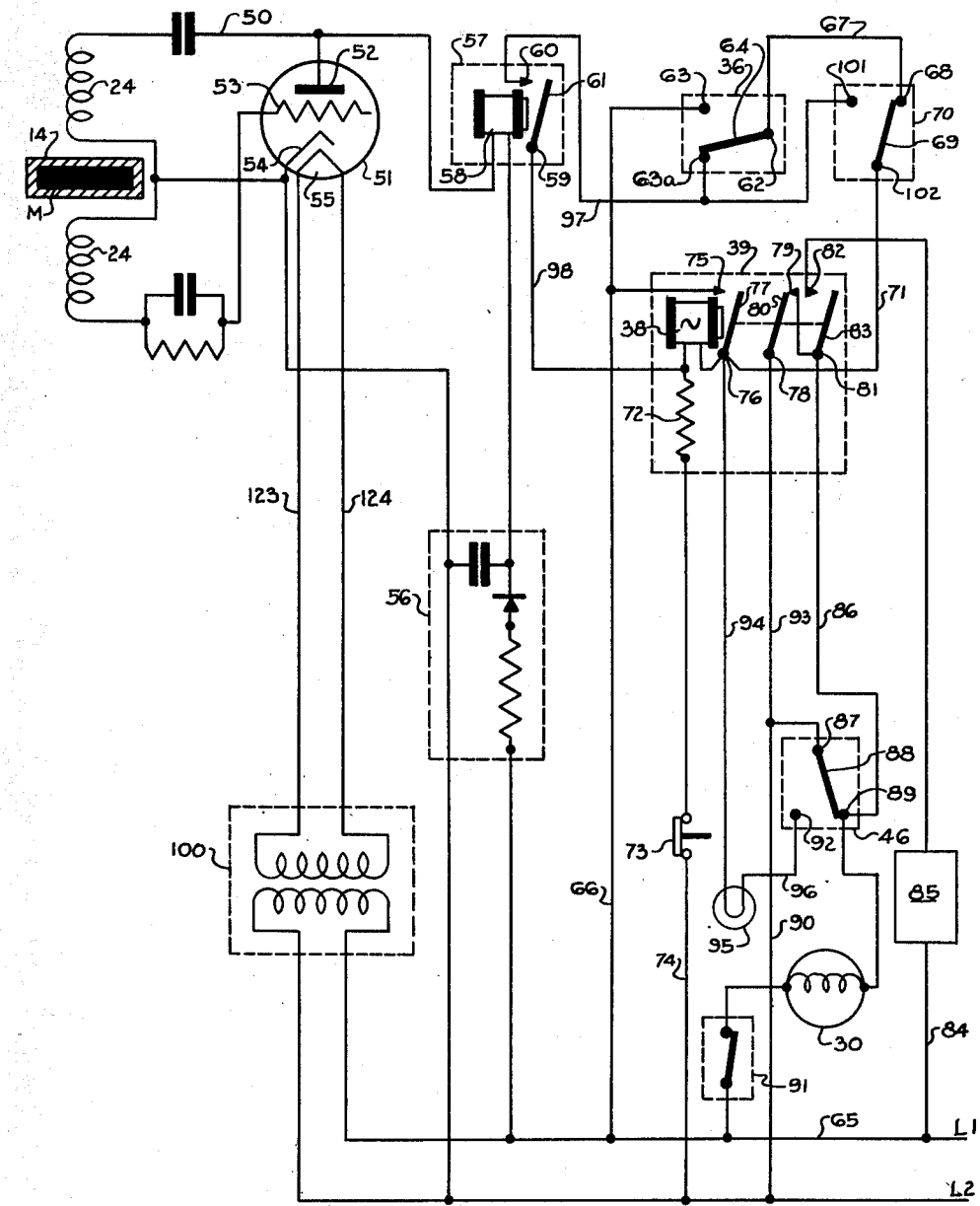
Figure 5 is a wiring diagram.

Referring first to Figure 3, a Venturi tube 10 is in a conduit 11, through which a fluid flows. The upstream section 12 of Venturi tube 10 communicates by means of a conduit 13 with leg 14 of a manometer 15, while the throat 16 of Venturi tube 10 communicates by means of a conduit 17 with the other leg 18 of manometer 15. The upper end of manometer leg 18 has an enlarged section 19. The leg 14 to which the upstream section 12 communicates by means of conduit 13 is made of an electrically non-conductive substance such as plastic and has internal and external sections rectangular in form.

The manometer 15 contains a metallic manometric liquid such as mercury M. When there is no flow through the Venturi tube, the mercury levels in legs 14 and 18 will be the same, this level being the zero or basic level Z.

As best shown in Figure 1, a lever 20 has near one end a bearing 21 and is adapted to oscillate about a stationary pin 22. A counterweight 23 at the end of lever 20 nearly, but not completely, balances the lever and its associated parts. The other or inner end of lever 20 is bifurcated and at the end of each branch is fixed a coil 24, these coils being part of an electronic oscillating circuit. The coils 24 are so mounted that they straddle the mercury column in leg 14 of manometer 15 as the lever 20 oscillates about pin 22. Intermediate the ends of lever 20 is fixed a stationary stub shaft 25 on which a roller 26 may rotate.

A synchronous motor 30 provided with a reduction gear, not shown, has an output shaft 31. On this shaft which rotates at a relatively slow speed is fixed a cam 32, which rotates at a uniform speed in counterclockwise direction. The roller 26 rides on the contoured edge of cam 32 and is held in contact with it by gravity. The dimensions and contour of the cam 32 are such that the upper limit of movement of the coils 24 is slightly higher than the zero level Z of the mercury M, while the lower limit of movement of the coils 24 is somewhat lower than the lowermost level the mercury in leg 14 can reach, this level corresponding to the maximum flow rate through conduit 11.

The differential pressure produced by a Venturi tube or orifice varies as the square of the flow rate; therefore the distance from the zero level Z in leg 14 of manometer 15 to the mercury level at any time will also vary as the square of the flow rate. However, by providing the cam 32 with the proper contour, the time required for the coils 24 to lower between the zero level Z and the level of the mercury in leg 14 may be made directly proportional to the flow rate through conduit 11 corresponding to the level of the mercury.

It is during this time that the signal is telemetered to the remote location.

It has been found entirely satisfactory in many cases to telemeter these signals once every minute; the duration of a signal in any minute depending upon the flow rate through the Venturi tube. In such case the cam 32 makes one revolution per minute and the transmitter may be said to operate in one minute cycles.

It is evident that it is desirable to have the duration of the signal in each cycle at maximum flow rate to be as long as possible. Accordingly, means, described later, are provided whereby during approximately 90 per cent of the cycle the transmitter is capable of telemetering signals of the proper duration and during the remaining 10 per cent of the cycle the coils 24 are restored to their uppermost position and then lowered to the zero level Z at which the timing in the cycle begins.

On the cam 32 is fixed an extended arm 33, the outer end 34 of which is adapted to engage the actuating roller 35 of a double throw snap action switch 36 (one type of which is known as "Micro Switch" as manufactured by a division of First Industrial Corporation of Freeport, Illinois) at the moment when the zero level Z is reached by the coils 24, whereby the normally open contact of switch 36 is closed for a short period of time. For convenience, switches of the type of switch 36 will be referred to herein as Micro Switch, but it will be understood that other switches of this type can be used. Closing of the normally open contact of switch 36 energizes the coil 38 of three pole relay 39 (see Figure 5) to start telemetering the signal. Relay 39 is of the electrical interlock type such that a momentary closing of the switch 36 will keep the relay coil 38 energized and maintain telemetering the signal. When the coils 24 reach the actual level M1 of the mercury in leg 14 of manometer 15, the relay coil 38 is short circuited to de-energize the coil and telemetering of the signal will cease. The operation of a relay, such as 39, is well known to those skilled in the art.

Also mounted on the arm 33, near its outer end 34, is a fixed pin 40 about which a roller 41 is free to rotate. Fixed to lever 20 intermediate the pins 21 and 25 is an extension 42 which lies in the path of travel of roller 41.

When the cam 32 has rotated through an angle (approximately 320°) such that the coils 24 have reached their lowermost position, as shown in Figure 2, the roller 41 on arm 33 will contact the underside of extension 42 and lift the free end of lever 20 and coils 24 to their uppermost position and then lower the lever 20 and coils 24 until the roller 26 on lever 20 comes to rest on cam 32 just before coils 24 reach the zero level Z. This movement of the lever 20 by the roller 41 is completed in about 10 per cent of the entire operating cycle.

When the coils 24 reach the zero level, telemetering of the signal begins.

Fixed to the cam 32 is also an arm 43 having at its outer end an extension 44 adapted to contact the roller 45 of a double throw Micro Switch 46.

Under certain conditions, as later explained, when extension 44 contacts roller 45, power will be cut off from motor 30 and it will come to a stop. The length of extension 44 is such that it will remain in contact with roller 45 after motor 30 has stopped.

The function of arm 43 and switch 46 is to give an alarm, stop motor 30 and stop telemetering signals upon failure of the electronic circuit to operate. Usually such failure occurs at the expiration of the life of an electronic tube. Upon replacement of this tube by a serviceable one and momentarily opening a normally closed switch, the system is once again placed in operation.

In the schematic wiring diagram of Figure 5, the electrical circuit used in one mode of operation of the invention is shown.

An electronic oscillating circuit is indicated generally at 50. It is shown for purposes of illustration as of the inductive type and comprises an electronic tube 51 having a plate 52, grid 53, cathode 54 and heater 55. A transformer 100 is shown as supplying power for the heater 55. A rectifier circuit is indicated generally at 56. One of the coils 24 is in the plate circuit and the other is in the grid circuit of tube 51. The coils 24 and the inter-electrode capacities of the tube 51 form an oscillating circuit. A relay 57 is connected in the plate circuit of the tube 51.

As is well known in the art, when coils 24 are properly disposed and free to react one with the other, oscillations are set up and the current in the plate circuit may be made of too low a value to actuate the relay 57. However, if a metallic substance such as the mercury M is interposed between the coils 24, oscillations will cease and the current in the plate circuit will immediately increase to such a value as will energize the coil 58 of relay 57 and bridge terminals 59 and 60 with pole 61 of relay 57. When the mercury M is removed, oscillations will be restored, the current in coil 58 of relay 57 will be reduced to a value where the coil will be de-energized, and the circuit between terminals 59 and 60 of relay 57 will be opened.

I have found that to stop oscillations it is not necessary for the mercury to be completely interposed between coils 24. When the mercury enters the space between the coils only part way, oscillation will cease and the relative position of the surface of the mercury and say, the center of the coil, at which oscillations cease, will always be the same.

The operation of my telemetering transmitter is as follows:

First assume that the flow rate through the conduit 11 is such that the mercury level in leg 14 is at say M1 and in leg 18 at M2: When the coils 24 reach the zero or datum level Z of the mercury, the end 34 of arm 33 will contact roller 35 of Micro Switch 36 (see Figure 1) and actuate the Micro Switch 36 to bridge its terminals 62 and 63 by pole 64 (see Figure 5). Current will then flow from line L1 of A. C. power supply through conductors 65 and 66, terminal 63, pole 64 and terminal 62 of switch 36, line 67, terminal 68, pole 69 and terminal 102 of double throw switch 70, line 71, coil 38 of relay 39, resistor 72 of relay 39, normally closed switch 73, conductor 74 and back to line L2 of the power supply. This will energize coil 38 to bridge terminals 75 and 76 by pole 77 of relay 39, unbridge terminals 78 and 79 normally bridged by pole 80 of relay 39, and bridge terminals 81 and 82 by pole 83 of relay 39.

When the end 34 of arm 33 leaves the roller 35 of switch 36 the contacts 62 and 63 of the switch will be unbridged. However, relay coil 38 will remain energized, current now passing from line L1 through conductors 65 and 66 to terminal 75, pole 77, terminal 76, coil 38, resistor 72, switch 73 and conductor 74 to line L2.

While relay coil 38 remains energized, current will flow from line L1 through conductor 84, load 85, terminal 82, pole 83, terminal 81, conductor 86, terminal 89, pole 88 and terminal 87 of Micro Switch 46 and conductor 90 to L2. The duration of this flow of current constitutes the telemetered signal to the load 85, the latter being in some cases say a motor which is to run only for the duration of the signal to operate say a chemical feeder for the purpose of treating a water supply flowing through the conduit 11 in proportion to the flow rate therethrough.

The cam motor 30 under normal conditions operates continuously, its power being derived from the source of power L1 through conductor 65, normally closed switch 91, motor 30, terminal 89, pole 88, terminal 87 and conductor 90 to line L2.

When coils 24 in their downward movement reach the level M1 of the mercury in leg 14 of manometer 15, oscillation of the electronic circuit will cease. This energizes the coil 58 of relay 57 to bridge terminals 59 and 60 by pole 61. This closes a circuit from L1 through conductors 65 and 66, terminal 75, pole 77, and terminal 76 of relay 39, conductor 71, terminal 102, pole 69 and terminal 68 of double throw switch 70, conductor 67, terminal 62, pole 64 and terminal 63a of Micro Switch 36, conductor 97, terminal 60, pole 61 and terminal 59 of relay 57, conductor 98, resistor 72, switch 73, and conductor 74 to L2. This will short circuit coil 38 of relay 39 to restore the poles of relay 39 to their original position and the signal will stop as the circuit is broken at pole 83 and terminal 82 of relay 39.

During the rotation of cam 32, the end 44 of arm 43 will contact roller 45 of Micro Switch 46 so that terminal 87 will be bridged to terminal 92 by pole 88 during the passage of end 44 along the roller 45. Under normal operation this occurs after relay 39 is de-energized and thus has no effect upon the circuit, since the current to operate motor 30 is obtained from line L1, through conductor 65, switch 91, motor 30, conductor 86, terminal 79, pole 80, terminal 78, conductor 93 to line L2.

If, however, due to a failure in the electronic circuit, relay 57 fails to operate, the coil 38 of relay 39 will have remained energized when end 44 of arm 43 contacts roller 45 of Micro Switch 46. Bridging of contacts 87 and 92 by pole 88 will, under these circumstances, close a circuit from line L1 through conductors 65 and 66, terminal 75, pole 77, line 94, lamp or other signal 95, conductor 96, terminal 92, pole 88, terminal 87 and line 90 to L2. At the same time motor 30 will stop, as its circuit is broken both between pole 80 and terminal 79 of relay 39 and at pole 88 and terminal 89 of switch 46. At the same time no signal will be telemetered as the circuit is broken between pole 88 and terminal 89 of switch 46. After the failure of the electronic circuit is corrected, such as replacing a defective tube, the switch 73 is momentarily opened to de-energize the relay 39 and break the circuit through the signal 95 and the coil 38, after which the alarm ceases and normal operation is resumed.

For purposes of establishing the zero level Z of the mercury M in leg 14 of manometer 15, the single pole normally closed switch 91 is placed in series with the motor 30 and the single pole double throw switch 70 is placed in the line 71 leading to the junction of terminal 76 and coil 38 of relay 39.

The procedure to establish the zero level is as follows: Mercury is placed in the manometer 15 until its level is somewhat below its zero level Z. Then by manipulating switch 91, the cam 32 is rotated until the roller 26 on lever 20 is in line with the zero mark indicated by the arrow on cam 32 and the end 34 of arm 33 engages roller 35 of Micro Switch 36 whereby coil 38 of relay 39 is energized to close the relay. In this position the coils 24 are at the zero level of the mercury. The pole 69 of switch 70 is then placed so that terminal 102 is bridged by pole 69 with terminal 101. Additional mercury is now slowly poured into manometer 15. When the mercury has risen between the coils 24 to such a level as will cause closing of relay 57 in the plate circuit of tube 51, the relay 39 will open since closing of relay 57 short circuits coil 38 of relay 39. It is at the moment when relay 57 closes and relay 39 opens that no further mercury is added and the zero level Z has been established. After this the switch 70 is restored to its normal position where pole 69 bridges contacts 68 and 102.

In the circuit just described, the telemetering will not be restored after a failure of a tube until the defective tube has been replaced. Where this would be objectionable, the circuit shown in Figure 6 may be used in which a standby tube is automatically placed in service, so that telemetering is not interrupted. At the same time a signal is given to show that the standby tube is now in service and that the defective tube should be replaced by a new tube, such new tube then acting as the standby. Immediate replacement of the defective tube is not necessary as the standby tube will function throughout its life which is of the order of 3000 hours.

In this circuit there are two electronic tubes 51 and 51a, having plates 52 and 52a, grids 53 and 53a and cathodes 54 and 54a respectively, the plates, grids and cathodes respectively being connected in parallel.

Relay 39 of Figure 5 is replaced by a relay 39a, Micro Switch 46 of Figure 5 is replaced by Micro Switch 46a, a relay 103 is added and a three pole double throw switch 104 with off position is added; arm 43 is removed and Micro Switch 46a is in the path of travel of the end 34 of arm 33.

Figure 6:
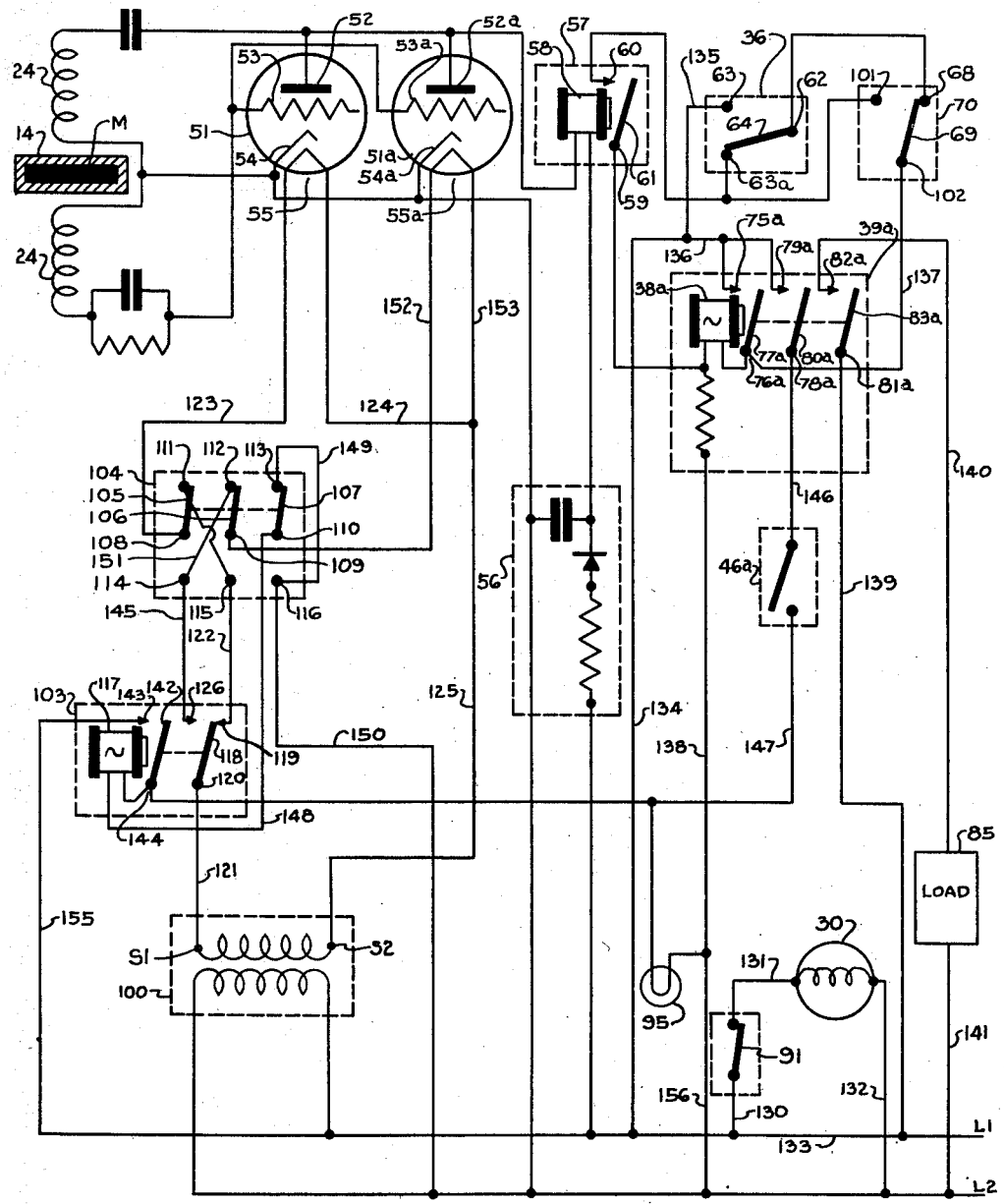
Figure 6 is an alternate wiring diagram.

The other elements shown in Figure 6 are the same as those of Figure 5.

Cam motor 30 runs continuously, the current being from L1, through conductors 133 and 130, normally closed switch 91, conductor 131, motor 30 and conductor 132 to L2.

Assume that the poles 105, 106 and 107 of switch 104 bridge terminals 108 and 111, 109 and 112 and 110 and 113, respectively, and that coil 117 of relay 103 is de-energized so that pole 118 bridges terminals 119 and 120. This applies power to heater 55 of tube 51 as follows: From terminal S1 of the secondary of transformer 100 through conductor 121, terminal 120, pole 118, terminal 119, conductor 122, terminal 115, terminal 111, pole 105, terminal 108, conductor 123, heater 55, conductors 124 and 125 to S2 of transformer secondary. No power will be applied to heater 55a of tube 51a as the circuit of this heater is broken between pole 118 and terminal 126 of relay 103.

Tube 51 is now in service and tube 51a acts as the standby.

When the roller 26 coincides with the zero mark on cam 32 (at which time coils 24 are at the zero level Z), end 34 of arm 33 will contact roller 35 of Micro Switch 36 and pole 64 will bridge terminals 62 and 63. The relay coils 38a of relay 39a will now be energized and pole 77a will bridge terminals 75a and 76a, pole 80a will bridge terminals 78a and 79a and pole 83a will bridge terminals 81a and 82a.

The circuit is as follows:

From line L1 through conductors 133, 134 and 135, terminal 63 or Micro Switch 36, pole 64, terminal 62, terminal 68 of switch 70, pole 69, terminal 102, conductor 137, coil 38a and conductors 138 and 156 of line L2. A circuit will also be established to maintain relay 38a energized when the circuit is broken at pole 64 and terminal 63 of Micro Switch 36, when the end 34 of arm 33 leaves roller 35 of Micro Switch 36 as follows:

From line L1 through conductors 133, 134 and 136, terminal 75a, pole 77a, terminal 76a, coil 38a and conductors 138 and 156 to line L2.

A circuit will also be established from line L1 through conductor 139, terminal 81a, pole 83a, terminal 82a, conductor 140, load 85 and conductor 141 to line L2. The duration of the flow of current through this circuit constitutes the telemetered signal.

When coils 24 in their downward movement reach the level M1 of the mercury in leg 14 of manometer 15, the coil 38a of relay 39a will be short circuited to restore the poles of relay 39a to their original open position, as outlined in connection with Figure 5, and telemetering of the signal will cease.

Under normal operating conditions, the poles of relay 39a will always be in their normal open position when coils 24 begin their upward travel. Therefore, when end 34 of arm 33 contacts roller 45 of Micro Switch 46a to close it, there will be no effect since the circuit in which 46a is located is broken between pole 80a and terminal 79a of relay 39a.

If, however, due to a failure of tube 51, the poles of relay 39a do not assume their normally open position but remain in a closed position when switch 46a is closed, a circuit will be established as follows:

From line L1, through conductors 133, 134, 136, terminal 79a, pole 80a, terminal 78a, conductor 146, closed switch 46a, conductor 147, coil 117 of relay 103, conductor 148, terminal 110 of switch 104, pole 107, terminal 113, conductors 149 and 150 to line L2.

Coil 117 will now be energized, pole 142 will bridge terminals 143 and 144 and pole 118 will bridge terminals 120 and 126.

Relay coil 117 will remain energized even though switch 46a opens after the end 34 of arm 33 leaves roller 45 of Micro Switch 46a.

The circuit of heater 55 of tube 51 will be broken between pole 118 and terminal 119 of relay 103 and a closed circuit will be established to heater 55a of tube 51a as follows:

From S1 of transformer 100 through conductor 121, terminal 120, pole 118 and terminal 126 of relay 103, conductor 145, terminal 114 of switch 104, conductor 151, terminal 112, pole 106, terminal 109, conductor 152, heater 55a, and conductors 153 and 125 to terminal S2 of transformer 100.

At the same time a circuit will be established from line L1 through conductors 133 and 155, terminal 143, pole 142, and terminal 144 of relay 103, alarm 95 and conductor 156 to L2, to give notice that the tube previously in service should be replaced.

Immediately after the defective tube is replaced, the poles of switch 104 are thrown in the opposite position so that poles 105, 106 and 107 will bridge terminals 108 and 114, 109 and 115 and 110 and 116 respectively. During the transition of poles 105, 106 and 107, from their previous position to their new position, the power circuit to the coil 117 of relay 103 will be broken between pole 107 and terminal 113 to de-energize the coil. The poles of the relay will then assume their normally open position and the alarm 95 will cease since its circuit is broken between pole 142 and terminal 143.

When pole 107 bridges terminals 110 and 116 in their new position, the relay coil 117 will remain de-energized since line L1 connects to relay 117 only when pole 80a is bridging terminals 79a and 78a of relay 39a at the time switch 46a closes. This condition, as outlined above, can occur only when the electronic tube then in service fails. Also coil 117 does not connect to line L1 through conductor 155 unless relay coil 117 is first energized through pole 80a of relay 39a and switch 46a to bridge its terminals 143 and 144 by pole 142.

With the poles of relay 103 in their normal position and poles 105, 106 and 107 of switch 104 bridging terminals 108 and 114, 109 and 115 and 110 and 116, respectively, power is supplied to heater 55a of tube 51a as follows:

From S1 of transformer 100, conductor 121, terminal 120 of relay 103, pole 118, terminal 119, conductor 122, terminal 115, pole 106 and terminal 109 of switch 104, conductor 152, heater 55a and conductors 153 and 125 to S2 of transformer 100. Tube 55a is now in service and the replacement tube for tube 51 is now the standby.

A subsequent failure of tube 51a will fail to de-energize relay coil 38a of relay 39a so that as described above pole 80a will be in bridging position between terminals 78a and 79a when switch 46a closes. This, as already described, will energize coil 117 of relay 103 to bridge terminals 120 and 126 by pole 118. A circuit will now be established to apply power to heater 55 of tube 51 as follows:

From S1 of transformer 100 through conductor 121, terminal 120, pole 118 and terminal 126 of relay 103, conductor 145, terminal 114, pole 105 and terminal 108 of switch 104, conductor 123, heater 55, conductors 124 and 125 to S2. This places the tube 51 in service.

When the coil 117 is energized and pole 142 bridges terminals 143 and 144 of relay 103, the circuit from L1 through the signal 95 to L2, described above, is closed, so that the signal will indicate that the standby tube 51 has been taken in service and tube 51a should be replaced. When the defective tube 51a has been replaced by a new tube, the poles 105, 106 and 107 are thrown in the opposite or original position to de-energize relay coil 117 of relay 103 and stop the alarm.

The description of the operation for placing a standby tube in service as given above applies to any subsequent failure of a tube to function.

It will be seen that I have invented a highly accurate transmitter which eliminates errors due to friction and which operates over a long period of time entirely automatically, manual service being limited to the time when replacement of an electronic tube becomes necessary.

Many changes of the preferred apparatus shown and described could be made without departing from the scope and spirit of my invention. Thus, it will be obvious to those skilled in the art that instead of moving the coils 24, the manometer 15 could be raised and lowered. Accordingly, I do not wish to limit myself to the exact structural details of the preferred embodiment described herein for purposes of illustration but not of limitation.

I claim:

1. Apparatus for telemetering signals proportional to the magnitude of a condition comprising an electronic circuit including an electronic tube, coil means connected in part in the plate circuit of said tube and in part in the grid circuit of said tube and operable to set up oscillations in said electronic circuit, a metallic substance whose position is a measure of the magnitude of said condition, means effecting a cyclic relative motion between said coil means and said substance from one predetermined end position to another, means for closing a signaling circuit at the one end position of said movement, and means for opening said signaling circuit when the relative position of said metallic substance to said coil means is such as to stop oscillations in said electronic circuit.

2. Apparatus for telemetering signals proportional to the magnitude of a condition comprising an electronic circuit including an electronic tube, coil means connected in part in the plate circuit of said tube and in part in the grid circuit of said tube and operable to set up oscillations in said electronic circuit, means for cyclically moving said coil means from one predetermined end position to another, a metallic substance whose position is a measure of the magnitude of said condition, said substance being located within the range of movement of said coil means, means for closing a signaling circuit when said coil means is at said one predetermined end position, and means for opening said signaling circuit when said coil means reaches the location of said metallic substance.

3. In a telemetering transmitter including a manometer, an electrically conductive fluid in said manometer, one leg of said manometer being adapted to be connected to a source of high pressure and the other leg being adapted to be connected to a source of low pressure, an electronic circuit including an electronic tube, coil means connected in part in the plate circuit of said tube and in part in the grid circuit of said tube and operable to set up oscillations in said electronic circuit, means for gradually moving said coil means along said one leg from a predetermined datum level to a predetermined lower level, means operative to start a signal when said coil means reach the datum level, and means operative to stop said signal when oscillations in said electronic circuit cease due to said coil means reaching on the downward travel the fluid surface in said one leg.

4. In a telemetering transmitter a manometer including an electrically conductive manometric fluid and adapted to be connected to a source of high pressure with one leg and to a source of low pressure with its other leg, said one leg being of an electrically non-conductive material, an electronic oscillating circuit including two coils and an electronic tube, one of said coils being connected in the plate circuit of said tube, the other of said coils being connected in the grid circuit of said tube, said coils straddling said one leg and being so located with respect to one another as to be mutually inductive to set up oscillations in said electronic circuit, means for gradually moving said coils at a predetermined rate from an upper datum level downwardly to a predetermined lower level, means operative to start a signal when said coils reach the datum level, and means operative to stop said signal when said coils, on their downward travel, reach the surface of the fluid in said one leg.

5. In combination with a manometer including an electrically conductive manometric fluid and adapted to be connected to a source of high pressure with one leg and to a source of low pressure with the other leg, said one leg being of non-metallic material, an electronic oscillating circuit including two coils and an electronic tube, one of said coils being connected in the plate circuit of said tube, the other of said coils being connected in the grid circuit of said tube, said coils being so located with respect to one another as to be mutually inductive to set up oscillations in said electronic circuit, means for moving said coils along said one leg from an upper datum level to a predetermined lower level at a predetermined rate, said means including a lever supporting said coils, said lever being free to oscillate around a fixed support, a cam, means for rotating said cam at a uniform speed, and a member carried by said lever and adapted to ride on the edge of said cam, means carried by said cam and operative to close an actuating circuit for a signal when said coils are at the predetermined datum level, and means for opening said actuating circuit when said coils reach the surface of manometric fluid in said one leg.

6. The apparatus of claim 5 including also means carried in part by said lever and in part by said cam and operative when said coils reach the predetermined lower level to return said coils to the predetermined datum level at a higher rate than the rate of downward travel of said coils.

7. In a telemetering transmitter a manometer including mercury and adapted to be connected to a source of high pressure with one leg and to a source of low pressure with its other leg, said one leg being of a non-metallic material, an electronic oscillating circuit including two coils and an electronic tube, one of said coils being connected in the plate circuit of said tube, the other of said coils being connected in the grid circuit of said tube, said coils straddling said one leg and being so located with respect to one another as to be mutually inductive to set up oscillations in said electronic circuit, means for gradually moving said coils at a predetermined rate from an upper datum level downwardly to a predetermined lower level, a normally open switch, means for momentarily closing said switch when said coils reach the datum level, a relay connected in the plate circuit of said tube and adapted to be actuated when the coils reach the mercury level in said one leg and oscillations cease in said electronic circuit, and an electric circuit including a second relay for actuating a telemetering signal, said circuit being closed by closing of said switch and being opened by closing of said first relay.

8. The apparatus of claim 7 including an alarm, a circuit through said alarm, and means for closing said circuit upon failure of said first relay to break the actuating circuit for said telemetering signal when said tubes reach the mercury level in said one leg.

9. A telemetering transmitter comprising a manometer including an electrically conductive manometric fluid and adapted to be connected to a source of high pressure with one leg and to a source of low pressure with the other leg, said one leg being of a non-conductive material, an electronic oscillating circuit including two coils and two electronic tubes, said tubes having their plates, grids and cathodes connected in parallel, one of said coils being in the plate circuits of said tubes and the other in the grid circuits of said tubes, a power circuit for each of said tubes, means operative to close the power circuit to one of said tubes and to simultaneously open the power circuit to the other of said tubes, means for gradually moving said coils downwardly along said one leg at a predetermined rate from an upper datum level to a predetermined lower level, a relay connected in the plate circuits of said tubes and adapted to be actuated when said coils, on their downward movement, reach the fluid level in said one leg and oscillations in said electronic circuit cease, an electric circuit for actuating a telemetering signal, means for closing said circuit when said coils reach said datum level, said circuit being opened by closing of said relay, and means operative upon failure of said relay to close when said coils reach the fluid level in said one leg to open the power circuit to said one tube and simultaneously to close the power circuit to said other tube.

10. In an apparatus for telemetering signals proportional to the magnitude of a condition, said apparatus including a manometer having two legs adapted to be connected to a source of high pressure and a source of low pressure, respectively, and an electrically conductive fluid in said manometer, an electronic circuit including an electronic tube, coil means connected in part in the plate circuit of said tube and in part in the grid circuit of said tube and operable to set up oscillations in said electronic circuit, means for cyclically moving said coil means from one predetermined level to another predetermined level, said manometric fluid having a surface within the range of movement of said coil means, means operative to close a signaling circuit when said coil means reach said one predetermined level, and means operative to open said signaling circuit when said coil means reach said surface.

SAMUEL L. ADELSON.

REFERENCES CITED

The following references are of record in the file of this patent:

UNITED STATES PATENTS

| Number | Name | Date |
| --- | --- | --- |
| 2,308,645 | Chappell et al. | Jan. 19, 1943 |
| 2,403,890 | Johnson | July 9, 1946 |
| 2,419,487 | Dresser | Apr. 22, 1947 |